United States Patent
Lin et al.

(10) Patent No.: US 11,696,258 B2
(45) Date of Patent: *Jul. 4, 2023

(54) METHOD AND APPARATUS FOR PERFORMING RADIO RESOURCE SELECTION AND CONTENTION INDICATION IN WIRELESS COMMUNICATION SYSTEM

(71) Applicant: GUANGDONG OPPO MOBILE TELECOMMUNICATIONS CORP., LTD., Guangdong (CN)

(72) Inventors: Huei-Ming Lin, South Yarra (AU); Zhenshan Zhao, Guangdong (CN); Qianxi Lu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/480,952

(22) Filed: Sep. 21, 2021

(65) Prior Publication Data
US 2022/0007340 A1   Jan. 6, 2022

Related U.S. Application Data

(63) Continuation of application No. 17/162,499, filed on Jan. 29, 2021, now Pat. No. 11,166,260, which is a
(Continued)

(51) Int. Cl.
*H04W 4/00* (2018.01)
*H04W 72/02* (2009.01)
(Continued)

(52) U.S. Cl.
CPC .......... *H04W 72/02* (2013.01); *H04W 72/56* (2023.01); *H04W 74/08* (2013.01); *H04W 4/44* (2018.02); *H04W 4/46* (2018.02)

(58) Field of Classification Search
CPC ..... H04W 72/02; H04W 72/10; H04W 74/08; H04W 4/44; H04W 4/46; H04W 4/40; H04W 28/26; H04W 72/085; H04W 92/18
(Continued)

(56) References Cited

U.S. PATENT DOCUMENTS 10,736,128 B2   8/2020   Lee et al.
11,166,260 B2 *  11/2021   Lin ....................... H04W 74/08
(Continued)

FOREIGN PATENT DOCUMENTS

CN   103200695 A   7/2013
CN   104285491 A   1/2015
(Continued)

OTHER PUBLICATIONS

3GPP TSG RAN WG1 Meeting #85—Nanjing, China May 23-27, 2016—R1-165046—Nokia, Alcatel-Lucent Shanghai Bell, On SCI Contents (6 pages).
(Continued)

*Primary Examiner* — Chuong T Ho
(74) *Attorney, Agent, or Firm* — Perkins Coie LLP

(57) ABSTRACT

A method and an apparatus for performing a radio resource selection and contention indication in a wireless communication system are provided. The method for performing, a user equipment (UE), the radio resource selection and contention indication in the wireless communication system includes selecting a plurality of sidelink resources from a sidelink resource pool and contending at least one of the sidelink resources reserved in advance from another UE.

18 Claims, 5 Drawing Sheets

Related U.S. Application Data continuation of application No. PCT/CN2018/098281, filed on Aug. 2, 2018.

(51) Int. Cl.
*H04W 74/08* (2009.01)
*H04W 72/56* (2023.01)
*H04W 4/46* (2018.01)
*H04W 4/44* (2018.01)

(58) Field of Classification Search
USPC .................................................. 370/329, 330
See application file for complete search history.

(56) References Cited

U.S. PATENT DOCUMENTS

| | | | |
|---|---|---|---|
| 2016/0302215 | A1 | 10/2016 | Sorrentino |
| 2017/0041902 | A1 | 2/2017 | Sheng |
| 2018/0014174 | A1 | 1/2018 | Zhou et al. |
| 2018/0103490 | A1* | 4/2018 | Li .......................... H04W 88/02 |
| 2018/0234980 | A1 | 8/2018 | Li et al. |
| 2019/0246430 | A1 | 8/2019 | Baghel et al. |
| 2019/0246431 | A1* | 8/2019 | Baghel .............. H04W 72/1247 |
| 2019/0289615 | A1 | 9/2019 | Lee et al. |
| 2019/0306912 | A1* | 10/2019 | Cheng ..................... H04W 4/40 |
| 2020/0008230 | A1 | 1/2020 | Yu et al. |

FOREIGN PATENT DOCUMENTS

| | | |
|---|---|---|
| CN | 106060931 A | 10/2016 |
| CN | 106211025 A | 12/2016 |
| CN | 107079275 A | 8/2017 |
| CN | 107592327 A | 1/2018 |
| EP | 3335495 A1 | 6/2018 |
| EP | 3335495 B1 | 7/2020 |
| WO | 2016053639 A1 | 4/2016 |
| WO | 2017005293 A1 | 1/2017 |
| WO | 2018027528 A1 | 2/2018 |
| WO | 2018062832 A1 | 4/2018 |

OTHER PUBLICATIONS

3GPP TSG-RAN WG1 Meeting #94—Goteborg, Sweden, Aug. 20-24, 2018—R1-1809304—Ericsson, Radio Resource Management for NR Sidelink Communication (6 pages).
3GPP TSG-RAN WG1 Meeting #94—Gothenburg, Sweden, Aug. 20-24, 2018—R1-1808906—OPPO, Discussion on resource allocation in NR-V2X (4 pages).
EPO, Extended European Search Report for European Patent Application No. 18928979.6. dated Jun. 21, 2021. 10 pages.
Intel Corporation "Priority Support for D2D Communication" R1-154587; 3GPP TSG RAN WG1 Meeting #82; Beijing, China; Aug. 24-28, 2015. 5 pages.
International Search Report dated Apr. 28, 2019 of PCT/CN2018/098281 (2 pages).
IPA, Examination Report No. 1 for Australian Patent Application No. 2018435267. dated Sep. 9, 2021. 3 pages.
Non-Final Office Action dated Mar. 11, 2021 of U.S. Appl. No. 17/162,499, filed Jan. 29, 2021.
Notice of Allowance dated Jun. 29, 2021 of U.S. Appl. No. 17/162,499, filed Jan. 29, 2021.
Examination Report for European Application No. 18928979.6 dated Mar. 4, 2022. 7 pages.
Examination Report for Indian Application No. 202127002962 dated Jan. 6, 2022. 8 pages with English translation.
First Office Action for Chinese Application No. 202110278048.9 dated Feb. 9, 2022. 14 pages with English translation.
Notice of Acceptance for Australian Application No. 2018435267 dated Mar. 2, 2022. 3 pages.
Notice of Reasons for Refusal for Japanese Application No. 2021-505242 dated Feb. 15, 2022. 7 pages with English translation.
USPTO, Corrected Notice of Allowability for U.S. Appl. No. 17/162,499. dated Sep. 30, 2021. 4 pages.
Decision of Refusal for Japanese Application No. 2021-505242 dated Sep. 9, 2022. 4 pages with English translation.
Examination Report for European Application No. 18928979.6 dated Sep. 16, 2022. 7 pages.
Examination Report for Taiwanese Application No. 108127651 dated Sep. 19, 2022. 11 pages with English translation.
Examination Report for European Application No. 18928979.6 dated Feb. 24, 2023. 8 pages.
Notice of Termination of Reconsideration by Examiners before Appeal Proceedings for Japanese Application No. 2021-505242 issued Feb. 28, 2023. 2 pages with English translation.
Reconsideration Report by Examiner before Appeal for Japanese Application No. 2021-505242 issued Feb. 21, 2023. 7 pages with English translation.
Request for the Submission of an Opinion for Korean Application No. 10-2021-7005506 dated Dec. 19, 2022. 11 pages with English translation.

* cited by examiner

METHOD AND APPARATUS FOR PERFORMING RADIO RESOURCE SELECTION AND CONTENTION INDICATION IN WIRELESS COMMUNICATION SYSTEM

CROSS-REFERENCE TO RELATED APPLICATION

This application is a continuation application of the U.S. application Ser. No. 17/162,499, filed Jan. 29, 2021, which is a continuation application of International Application No. PCT/CN2018/098281 filed on Aug. 2, 2018. The disclosures of the above applications are hereby incorporated by reference in their entireties.

BACKGROUND OF DISCLOSURE

1. Field of the Disclosure

The present disclosure relates to the field of communication systems, and more particularly, to a method and an apparatus for performing a radio resource selection and contention indication in a wireless communication system.

2. Description of the Related Art

As part of intelligent transportation system (ITS) evolution to support evermore advanced vehicle-to-everything (V2X) communications and services, it is inevitable that more critical data messages and more frequently the critical data messages need to be transmitted between user equipments (UEs) on road, and at same time, size of data messages is also likely to be increased to ensure proper operation of the ITS and continue to maintain a highly safe environment for road users.

In existing autonomous sidelink (SL) resource selection mechanisms, also commonly known as current sidelink mode 4, developed in releases 14 and 15 by 3rd generation partnership project (3GPP) for long term evolution (LTE)-V2X communication, a set of candidate SL resources that are available for message transmission should be first identified by a resource selecting UE based on past measurements of SL resources and reading of a sidelink control information (SCI) carried in a physical sidelink control channel (PSCCH) from other UEs during a sensing period. A SL resource should be deemed unavailable in a resource selection window if the SL resource has already been previously reserved by another UE on a same frequency location according to a resource reservation field in the SCI and also if a measured physical sidelink shared channel-reference signal received power (PSSCH-RSRP) level is above a certain configured threshold (SL-ThresPSSCH-RSRP). Furthermore, same frequency resource occurring every indicated resource reservation interval should also assume to be unavailable for selection by a transmitting UE. Therefore, in principle, for any resource that does not fall within the above resource exclusion criteria is a potential candidate that can be chosen by the resource selecting UE for transmitting SL messages. However, for a weakly measured PSSCH-RSRP level based on a demodulation reference signal (DMRS) of a transmitted PSSCH, this usually means the transmitted signal came from a far distance.

For any receiving UE (Rx-UE) in between an original message transmitting UE (Tx-UE) and resource selecting UE, the received PSSCH from the original Tx-UE may be of a reasonable power level and the message could be of high priority. If the resource selecting UE choses the same SL resource for its own message transmission which could be also of high priority, it may create collision to the original Tx-UE's high priority message and thus causing interference for all Rx-UEs in between these two UEs and likely neither messages would be decodable. Furthermore, when a ratio of available resources is less than 20%, the resource selection RSRP threshold (SL-ThresPSSCH-RSRP) is increased by 3 dB by the resource selecting UE, as such resources used for other higher priority messages may be also included for selection. Based on the release 15 mode 4 resource selection procedure, it is concluded that high priority messages are not well protected.

According to 3GPP technical report (TR) 22.886, in which captured all of future operating scenarios and advanced V2X use cases that should be supported by a next generation of V2X communication, such as new radio (NR)-V2X, much stringent requirements in terms of transmission latency and data delivery reliability than what has been specified in release 15 for broadcasting basic safety messages are described. As such, a much faster and robust transmission mechanism is needed in 5th generation new radio (5G-NR) system in order to fulfil these requirements. At the same time, utilization efficiency of limited available sidelink resources should be also improved to cater for ever more demanding amount of transmissions per user.

SUMMARY

An object of the present disclosure is to propose a method and an apparatus for performing a radio resource selection and contention indication in a wireless communication system for providing at least one of a simple and effective method of sidelink resource selection and contention for new radio (NR)-vehicle-to-everything (V2X) communication and a better protection to high priority messages in NR-V2X communication.

In a first aspect of the present disclosure, a user equipment (UE) in a wireless communication system includes a memory, a transceiver, and a processor coupled to the memory and the transceiver. The processor is configured to select a plurality of sidelink resources from a sidelink resource pool and contend at least one of the sidelink resources reserved in advance from another UE.

In a second aspect of the present disclosure, a method for performing, a user equipment (UE), a radio resource selection and contention indication in a wireless communication system includes selecting a plurality of sidelink resources from a sidelink resource pool and contending at least one of the sidelink resources reserved in advance from another UE.

In the implementation of the present disclosure, the method and the UE for performing the radio resource selection and contention indication in the wireless communication system includes selecting the sidelink resources from the sidelink resource pool and contending the at least one sidelink resource reserved in advance from the another UE, so as to provide at least one of a simple and effective method of sidelink resource selection and contention for NR-V2X communication and a better protection to high priority messages in NR-V2X communication.

BRIEF DESCRIPTION OF DRAWINGS

In order to more clearly illustrate the implementations of the present disclosure or related art, the following figures will be described in the implementations are briefly introduced. It is obvious that the drawings are merely some implementations of the present disclosure, a person having ordinary skill in this field can obtain other figures according to these figures without paying the premise.

DETAILED DESCRIPTION OF EMBODIMENTS

Embodiments of the present disclosure are described in detail with the technical matters, structural features, achieved objects, and effects with reference to the accompanying drawings as follows. Specifically, the terminologies in the implementations of the present disclosure are merely for describing the purpose of the certain implementation, but not to limit the disclosure.

Figure 1:
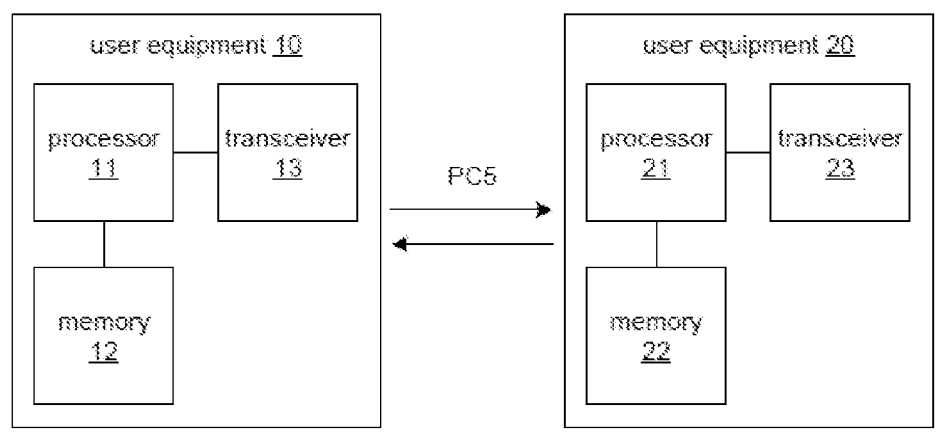
FIG. 1 is a block diagram of a user equipment for performing a radio resource selection and contention indication in a wireless communication system according to an implementation of the present disclosure.

FIG. 1 illustrates that, in some implementations, a user equipment (UE) 10 for performing a radio resource selection and contention indication in a wireless communication system according to an implementation of the present disclosure. The UE 10 may include a processor 11, a memory 12 and a transceiver 13. The processor 11 may be configured to implement proposed functions, procedures and/or methods described in this description. Layers of radio interface protocol may be implemented in the processor 11. The memory 12 is operatively coupled with the processor 11 and stores a variety of information to operate the processor 11. The transceiver 13 is operatively coupled with the processor 11, and transmits and/or receives a radio signal.

Another UE 20 may include a processor 21, a memory 22 and a transceiver 23. The processor 21 may be configured to implement proposed functions, procedures and/or methods described in this description. Layers of the radio interface protocol may be implemented in the processor 21. The memory 22 is operatively coupled with the processor 21 and stores a variety of information to operate the processor 21. The transceiver 23 is operatively coupled with the processor 21, and transmits and/or receives a radio signal.

The processors 11 and 21 may include application-specific integrated circuit (ASIC), other chipset, logic circuit and/or data processing device. The memories 12 and 22 may include read-only memory (ROM), random access memory (RAM), flash memory, memory card, storage medium and/or other storage device. The transceivers 13 and 23 may include baseband circuitry to process radio frequency signals. When the implementations are implemented in software, the techniques described herein can be implemented with modules (e.g., procedures, functions, and so on) that perform the functions described herein. The modules can be stored in the memories 12 and 22 and executed by the processors 11 and 21. The memories 12 and 22 can be implemented within the processors 11 and 21 or external to the processors 11 and 21 in which case those can be communicatively coupled to the processors 11 and 21 via various means as is known in the art.

The communication between the UE 10 and the UE 20 relates to vehicle-to-everything (V2X) communication including vehicle-to-vehicle (V2V), vehicle-to-pedestrian (V2P), and vehicle-to-infrastructure/network (V2I/N) according to a sidelink technology developed under 3rd generation partnership project (3GPP) long term evolution (LTE) release 15 and/or 5G-NR radio access technology. The UE 10 and the UE 20 are communicated with each other directly via a sidelink interface such as a PC5 interface.

In some implementations, the processor 11 of the UE 10 is configured to select a plurality of sidelink resources from a sidelink resource pool and contend at least one of the sidelink resources reserved in advance from another UE 20. In details, the processor 11 is configured to contend the at least one of the sidelink resources reserved in advance from another UE 20 when at least one of following conditions is met. The following conditions include there are no other immediately available sidelink resources selected and used without contention and/or collision from the sidelink resource pool, an observed channel busy ratio (CBR) of the sidelink resource pool is greater than 80%, an observed packet priority level transmitted by the another UE 20 is less than an observed packet priority level transmitted by the transceiver 13, and a contention rate of the sidelink resources reserved by the another UE 20 is less than or equal to 50%.

In some implementations, a ProSe per packet priority (PPPP) level of at least one data message transmitted by the another UE 20 is less than a PPPP level of at least one data message transmitted by the transceiver 13. A latency transmission of at least one data message transmitted by the another UE 20 is greater than a latency transmission of at least one data message transmitted by the transceiver 13. The transceiver 13 is configured to transmit at least one data message having a short transmit time interval. A transmission periodicity of at least one data message transmitted by the another UE 20 is greater than a transmission periodicity of at least one data message transmitted by the transceiver 13.

Furthermore, the processor 11 is configured to contend the at least one of the sidelink resources reserved in advance from the another UE 20 by indicating, in a sidelink control information (SCI), a resource reservation interval colliding with at least one resource reservation of the another UE 20. The transceiver 13 is configured to transmit a resource contention indication in advanced of at least one periodic cycle of at least one resource reservation of the another UE 20, such that the another UE 20 has time to detect and react with the resource contention indication. For examples, the transceiver 13 is configured to transmit a resource contention indication in advanced of at least one periodic cycle of at least one resource reservation of the another UE 20, such that the another UE 20 has time to find at least one alternative sidelink resource from the sidelink resource pool. The transceiver 13 is configured to transmit a resource contention indication in advanced of at least one periodic cycle of at least one resource reservation of the another UE 20, such that the another UE 20 has time to make at least one new resource reservation. The transceiver 13 is configured to transmit a resource contention indication in advanced of at least one periodic cycle of at least one resource reservation of the another UE 20, such that the another UE 20 has time to skip a message transmission in at least one contended resource.

In some implementations, the processor 11 is configured to determine whether the selected sidelink resources are a candidate for transmitting data messages according to a priority in a descending order of a PPPP level of the data messages. The processor 11 is configured to determine whether the selected sidelink resources are a candidate for transmitting data messages according to a priority in a descending order of a transmission periodicity of the data messages. The transmission periodicity of the data messages may include a resource reservation interval. The processor 11 is configured to determine whether the selected sidelink resources are a candidate for transmitting data messages according to a priority in a descending order of a measured reference signal received power (RSRP) level of the data messages. The processor 11 is configured to obtain the measured RSRP level of the data messages according to a demodulation reference signal (DMRS) of a physical sidelink control channel (PSCCH) of the sidelink resources, a DMRS of a physical sidelink shared channel (PSSCH) of the sidelink resources, a received signal strength indicator (RSSI) level of a guard period (GP) region of the sidelink resources, or a RSSI level of an automatic gain control (AGC) region of the sidelink resources.

Further, at least one sidelink resource reserved by a transmitted data message with a PPPP level is not a candidate by the UE 10 having a data message with a PPPP level less than or equal to the PPPP level of the transmitted data message. At least one sidelink resource reserved by a transmitted data message with a PPPP level is a candidate by the UE 10 having a data message with a PPPP level greater than the PPPP level of the transmitted data message. One of the sidelink resources with a reservation periodicity has higher priority for selection than another of the sidelink resources with a reservation periodicity less than the reservation periodicity of the sidelink resource. One of the sidelink resources with a measured RSRP level has higher priority for selection than another of the sidelink resources with a measured RSRP level greater than the measured RSRP level of the sidelink resource.

The implementation of the present disclosure aims to solve the above described problem in existing resource selection and exclusion scheme that does not provide good protection to high priority messages in LTE-V2X by introducing a new mechanism that allow UE 10 to select and contend for sidelink resources reserved for transmitting lower priority messages. The implementation of the present disclosure provides at least one of following advantages, such as benefits of new resource reservation and contention scheme, enhanced protection to high priority messages that are already scheduled to be transmitted, enhanced protection to newly arrived high priority messages that require new reservation of resources, more sidelink resources/transmission opportunities are provided for higher priority messages, and potentially higher utilization of sidelink resources.

In some implementations, a simple and effective resource selection and contention mechanism for transmitting high priority sidelink (SL) data messages is being disclosed, e.g. messages with high PPPP level, low latency requirements such as urgent transmissions, short transmit time interval (sTTI), and/or messages with short transmission periodicity. Based on at least one of the above conditions, a reserved SL resource with a high measured RSRP level and a low ProSe Per Packet Priority (PPPP) could still be selected and contented by a resource selecting UE such as the UE 10 for transmitting higher priority messages.

Further, in a highly utilized sidelink resource pool (e.g. observed CBR>80%) and/or a resource pool that have been (pre-)configured or permitted in advanced, a resource selecting UE with high priority message performs the following general procedure for reserving and contending SL resources that have previously reserved by other UEs for transmitting lower priority messages.

Step 1: Based on resource reservation, priority information and measured RSRP levels obtained from the resource sensing operation within a sensing period, the resource selecting UE identifies most suitable resources that satisfy at least one of the above described resource selection criteria for transmitting its high priority messages.

Step 2: If any of the selected SL resources from Step 1 would collide with another UE's already reserved resource, the resource selecting UE transmits its high priority messages well in advance of any collision (e.g. a length of at least packet latency or packet Tx periodicity of the original Tx-UE) and indicate using the resource reservation field in the SCI its intention to contend for at least one colliding resource.

For a Tx-UE that continues to monitor reservation information from the received PSCCH's and detects one or more of its reserved resource have been contended by another UE with higher priority messages, the Tx-UE may perform one of the following options:

Option 1: Skip its own message transmission in the contended resource(s) if the skipping of transmission still satisfies packet reception ratio and/or reliability requirements.

Option 2: Reselect another empty/available resource to transmit its SL message and avoid the collision.

Option 3: If the Tx collision is determined to be persistent (e.g. up to 50% of the original reserved resources are being contended), the Tx-UE performs reselection and reservation of a new frequency resource so that its SL messages may continue to be transmitted and still fulfil all defined packet reception ratio, reliability and latency requirements.

In some implementations, following priority order may be followed when selecting and contending for SL resources if there exist multiple resource contention opportunities, for which all satisfy the resource selection criteria described in the above implementations.

Priority order one (highest priority): SL resource with lowest PPPP level indicated in the transmitted message may be selected. If among the multiple resource contention opportunities there exist more than one opportunity having same lowest PPPP level, the following priority order two may be followed.

Priority order two (second priority): SL resource with longest resource reservation interval indicated in the transmitted message may be selected. If among remaining multiple resource contention opportunities after the priority order one there still exist more than one opportunity having same longest resource reservation interval, following priority order three may be followed.

Priority order three (third priority): SL resource with lowest measured RSRP level or RSSI level may be selected. The RSRP level could be measured based on DMRS of PSCCH or DMRS of PSSCH, and the RSSI level could be measured within a GP region or AGC region of the resource. If among remaining multiple resource contention opportunities after the priority order two there still exist more than one opportunity having the same lowest measured RSRP or RSSI level, then the final opportunity may be randomly selected with equal probability.

Consequently, a SL resource reserved by a transmitted message with higher PPPP level cannot be considered as a potential candidate/opportunity by the resource selecting UE having messages with lower PPPP level. Similarly, within different message PPPP levels, a SL resource reserved by a transmitted message with a PPPP level lower than resource selecting UE's message has higher priority than a SL resource reserved by a transmitted message with equal PPPP level to resource selecting UE's message.

Furthermore, within different resource reservation periodicities/intervals, a SL resource with longer reservation periodicity/interval has higher priority for selection than a SL resource with shorter reservation periodicity/interval. Also, within different measured RSRP levels, a SL resource with lower measured RSRP/RSSI level has higher priority for selection than a SL resource with higher measured RSRP/RSSI level.

Figure 2:
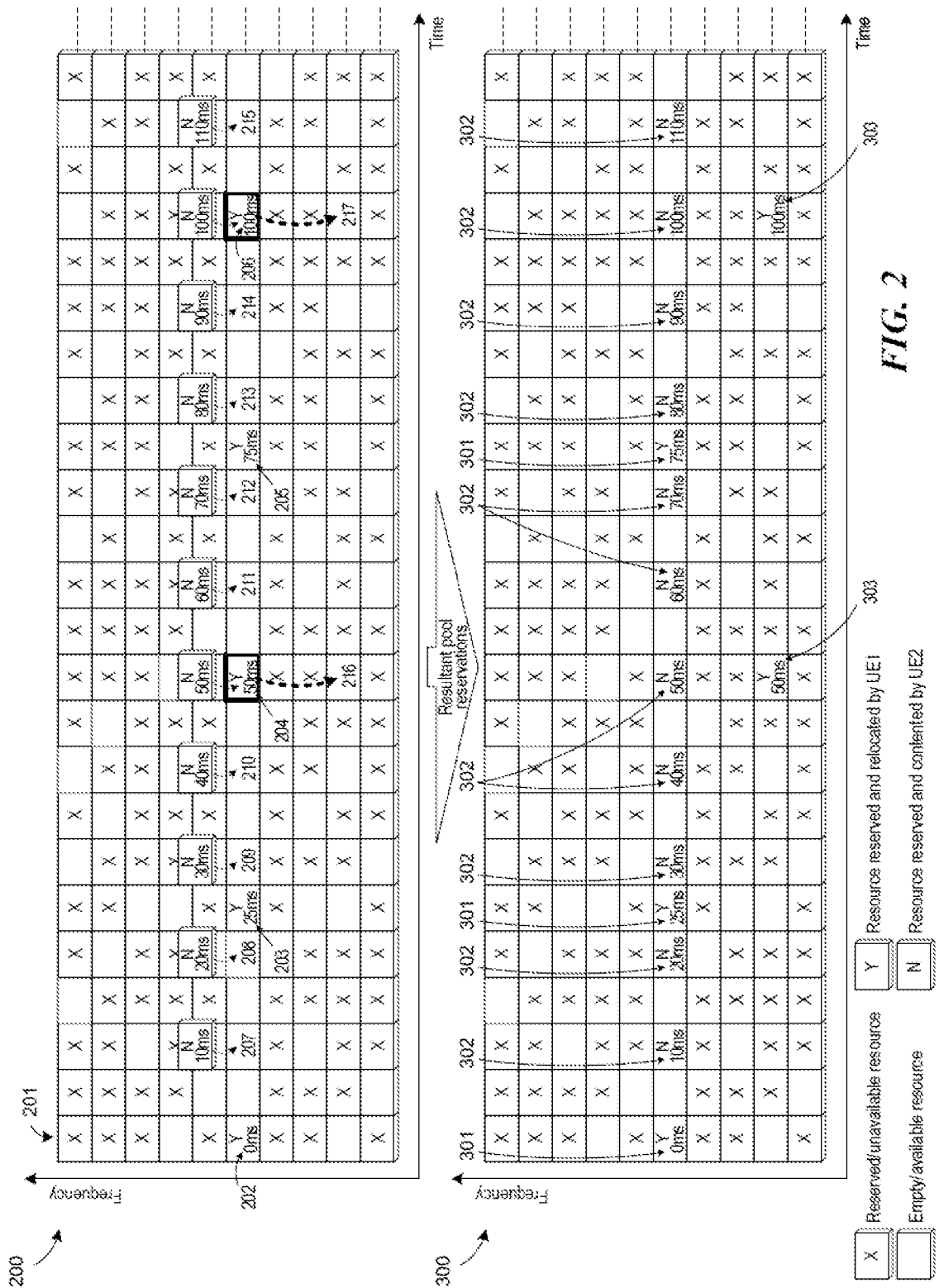
FIG. 2 is a diagram of a structure of a sidelink resource pool according to an implementation of the present disclosure.

In reference to FIG. 2, a proposed resource selection and contention operation for transmitting high priority messages over already reserved SL resources by another V2X UE is exemplary illustrated. In SL resource pools 200 and 300, a SL resource 201 could be of a length of one slot length with 14 symbols and a frequency size of 4 physical resource blocks (PRBs) which is equivalent to a sub-channel in LTE-V2X communication. A SL resource may consist of one or multiple sub-channels spanning across multiple time slots and/or higher number of PRBs. For a first UE that needs to periodically transmit V2X messages, the first UE reserves a set of SL resources with a gap interval of 25 ms 202, 203, 204, 205, 206 and so on in SL resource pool 200 by setting a resource reservation interval parameter to 25 ms in the SCI. A second UE that has higher priority messages to transmit than the first UE also need to periodically reserve SL resources in every 10 ms. Based on sensing and measurement results, the second UE identifies the set of SL resources in 207, 208, 209, 210, 204, 211, 212, 213, 214, 206 and 215 would be suitable selection of resources based on aforementioned set of resource selection criteria. As illustrated, most of these suitable resources are empty and not reserved 207, 208, 209, 210, 211, 212, 213, 214, 215, but at time instant 50 ms, 100 ms and so on, the selected resources in 204 and 206 are colliding with resources that have already been reserved by the first UE. In order for the second UE to reserve the selected set of suitable resources and contend for the colliding resources in 204 and 206, the second UE indicates a 10 ms resource reservation interval in the SCI every time the second UE transmits V2X messages in resources 207, 208, 209, 210, 204, 211, 212, 213, 214, 206, and 215.

Since the second UE periodically indicates its resource reservation of every 10 ms well in advanced starting from time equal to 10 ms, which is more than one period cycle of the first UE's reservation interval of 25 ms before the colliding resources 204 and 206, the first UE would have sufficient time to detect such pending collisions. Also based on reading of second UE's message priority level (PPPP value in the SCI) which is higher than first UE's message priority level, the first UE is also aware of the contending of these colliding resources from the second UE. As such, the first UE looks for alternative resources 216 and 217 for transmitting its message at time equal to 50 ms and 100 ms. Since the Tx collision/resource contention happens every 50 ms, the first UE could periodically reserve a new set of SL resource with a time gap of 50 ms, if there are available resources.

Consequently, the resultant reservation of resources for the SL resource pool is illustrated in 300, where the first UE would have two separate sets of reserved resources in 301 and 303, and the second UE would have successfully contended for the two colliding resources and reserved a set of resources in 302 for transmitting its higher priority messages.

Figure 3:
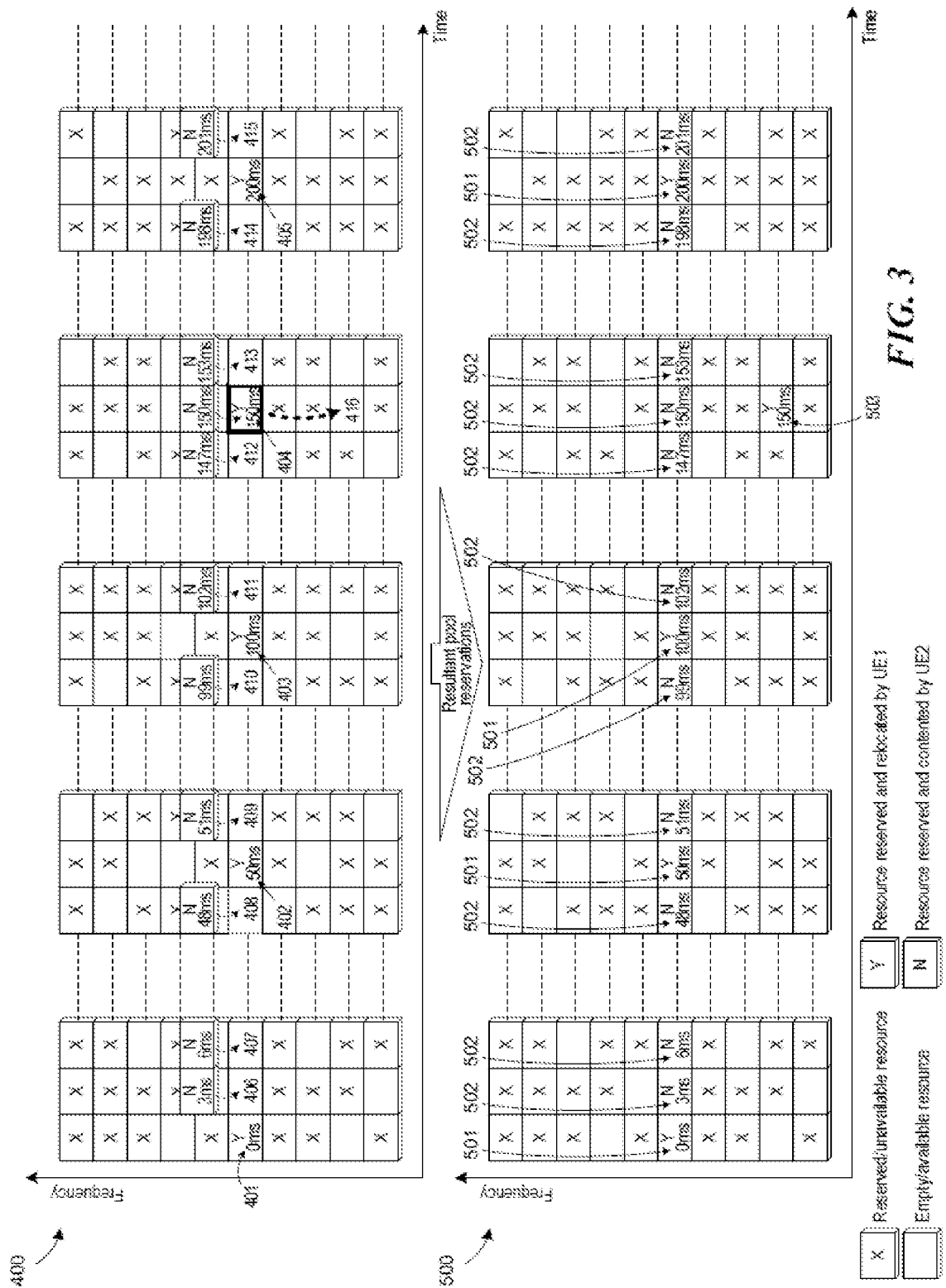
FIG. 3 is a diagram of a structure of a sidelink resource pool according to an implementation of the present disclosure.

In reference to FIG. 3, another exemplary illustration of the proposed resource selection and contention operation for transmitting high priority messages over already reserved SL resources by another V2X UE is illustrated. For a first UE that needs to periodically transmit V2X messages, the first UE reserves a set of SL resources with a gap interval of 50 ms 401, 402, 403, 404, 405 and so on in SL resource pool 400 by setting a resource reservation interval parameter to 50 ms in the SCI. A second UE that has higher priority messages to transmit than the said first UE also need to periodically reserve SL resources in every 3 ms. Based on sensing and measurement results, the second UE identifies the set of SL resources in 406, 407, 408, 409, 410, 411, 412, 404, 413, 414, and 415 would be suitable selection of resources based on aforementioned set of resource selection criteria. As illustrated, most of these suitable resources 406, 407, 408, 409, 410, 411, 412, 413, 414, 415 are empty and not reserved, but at time instant 150 ms and every 150 ms the selected resources in 404 and so on may collide with resources that have already been reserved by the first UE. In order for the second UE to reserve the selected set of suitable resources and contend for the colliding resources in 404 and so on, the second UE indicates a 3 ms resource reservation interval in the SCI every time, the second UE transmits V2X messages in resources 406, 407, 408, 409, 410, 411, 412, 404, 413, 414, and 415.

Since the second UE periodically indicates its resource reservation of every 3 ms well in advanced starting from time equal to 3 ms, which is more than one period cycle of the first UE's reservation interval of 50 ms before the colliding resources 404 and so on, the first UE would have sufficient time to detect such pending collisions. Also based on reading of second UE's message priority level (PPPP value in the SCI) which is higher than first UE's message priority level, the first UE is also aware of the contending of these colliding resources from the second UE. As such, the first UE looks for alternative resources 416 for transmitting its message at time equal to 150 ms. Since the Tx collision/resource contention happens every 150 ms, the first UE may choose to periodically reserve a new set of SL resource with a time gap of 150 ms, if there are available resources. Alternatively, the first UE may choose not to reserve a new set of resources and perform a one-shot transmission every 150 ms or skip a transmission if the first UE cannot find an available resource at that time without violating the associated packet received ratio and/or reliability requirements.

Consequently, the resultant reservation of resources for the SL resource pool is illustrate in 500, where the first UE may have just one set of reserved resources in 501 and a separate resource 503 for one-shot transmission at time equal to 150 ms, and the second UE would have successfully contended for the colliding resources and reserved a set of resources in 502 for transmitting its higher priority messages.

Figure 4:
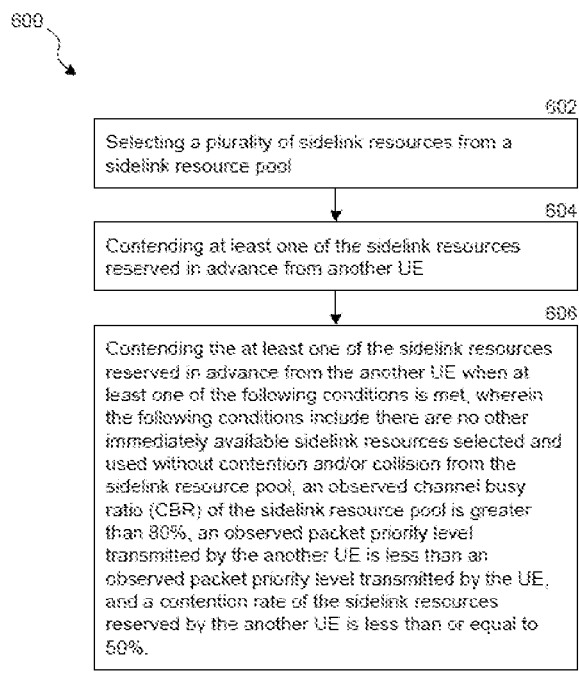
FIG. 4 is a flowchart illustrating a method for performing a radio resource selection and contention indication in a wireless communication system according to an implementation of the present disclosure.

FIG. 4 illustrates a method 600 for performing a radio resource selection and contention indication in a wireless communication system according to an implementation of the present disclosure.

The method 600 includes: at block 602, selecting a plurality of sidelink resources from a sidelink resource pool, at block 604, contending at least one of the sidelink resources reserved in advance from another UE 20, and at block 606, contending the at least one of the sidelink resources reserved in advance from the another UE when at least one of following conditions is met, wherein the following conditions include there are no other immediately available sidelink resources selected and used without contention and/or collision from the sidelink resource pool, an observed channel busy ratio (CBR) of the sidelink resource pool is greater than 80%, an observed packet priority level transmitted by the another UE 20 is less than an observed packet priority level transmitted by the UE 10, and a contention rate of the sidelink resources reserved by the another UE 20 is less than or equal to 50%.

In some implementations, the method 600 further includes transmitting at least one data message having a short transmit time interval. The method 600 further includes contending the at least one of the sidelink resources reserved in advance from the another UE 20 by indicating, in a sidelink control information, a resource reservation interval colliding with at least one resource reservation of the another UE 20. The method 600 further includes transmitting a resource contention indication in advanced of at least one periodic cycle of at least one resource reservation of the another UE, such that the another UE 20 has time to detect and react with the resource contention indication. The method 600 further includes transmitting a resource contention indication in advanced of at least one periodic cycle of at least one resource reservation of the another UE 20, such that the another UE 20 has time to find at least one alternative sidelink resource from the sidelink resource pool. The method 600 further includes transmitting a resource contention indication in advanced of at least one periodic cycle of at least one resource reservation of the another UE 20, such that the another UE 20 has time to make at least one new resource reservation. The method 600 further includes transmitting a resource contention indication in advanced of at least one periodic cycle of at least one resource reservation of the another UE 20, such that the another UE 20 has time to skip a message transmission in at least one contended resource.

In some implementations, the method 600 further includes determining whether the selected sidelink resources are a candidate for transmitting data messages according to a priority in a descending order of a PPPP level of the data messages. The method 600 further includes determining whether the selected sidelink resources are a candidate for transmitting data messages according to a priority in a descending order of a transmission periodicity of the data messages. The method 600 further includes determining whether the selected sidelink resources are a candidate for transmitting data messages according to a priority in a descending order of a measured reference signal received power (RSRP) level of the data messages. The method 600 further includes obtaining the measured RSRP level of the data messages according to a demodulation reference signal (DMRS) of a physical sidelink control channel (PSCCH) of the sidelink resources, a DMRS of a physical sidelink shared channel (PSSCH) of the sidelink resources, a received signal strength indicator (RSSI) level of a guard period (GP) region of the sidelink resources, or a RSSI level of an automatic gain control (AGC) region of the sidelink resources.

Figure 5:
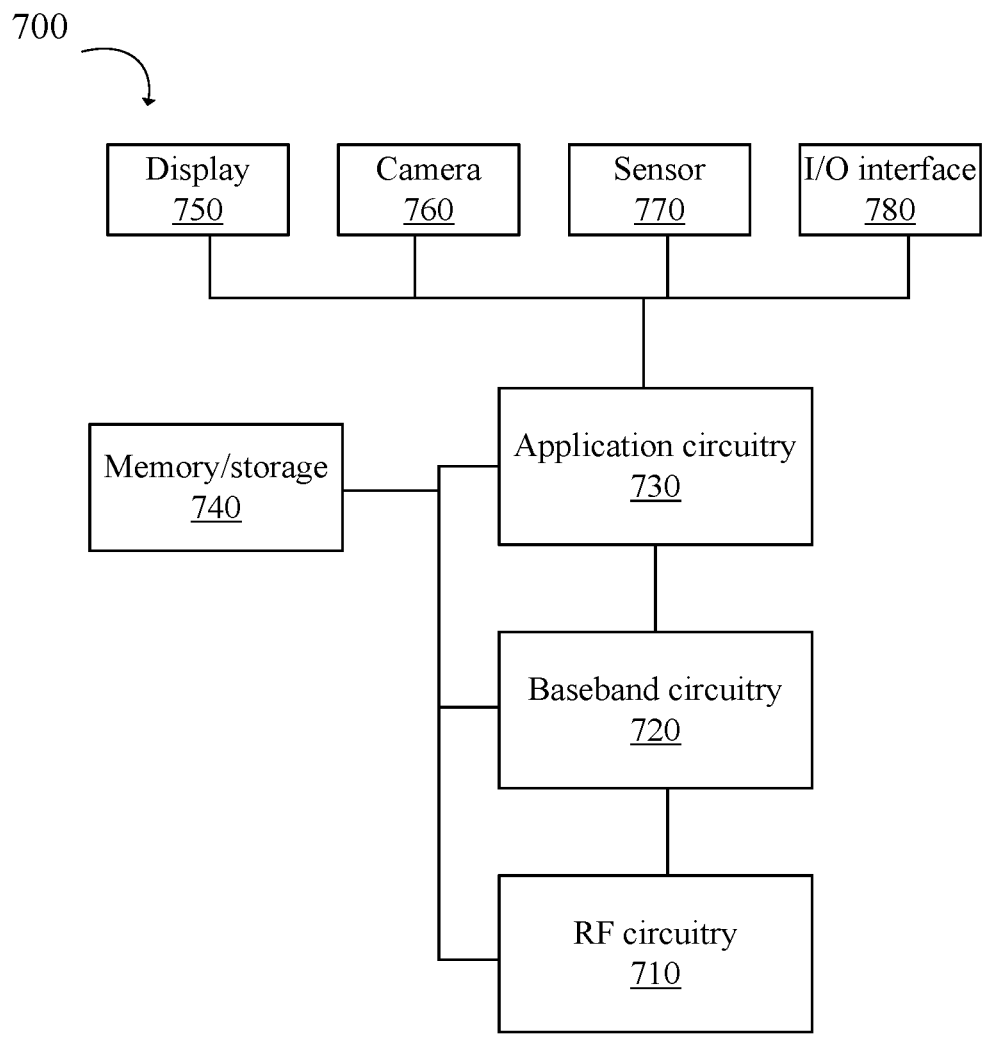
FIG. 5 is a block diagram of a system for wireless communication according to an implementation of the present disclosure.

FIG. 5 is a block diagram of a system 700 for wireless communication according to an implementation of the present disclosure. Embodiments described herein may be implemented into the system using any suitably configured hardware and/or software. FIG. 5 illustrates, for one implementation, an example system 700 comprising a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated.

The application circuitry 730 may include a circuitry such as, but not limited to, one or more single-core or multi-core processors. The processors may include any combination of general-purpose processors and dedicated processors, such as graphics processors, application processors. The processors may be coupled with memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some implementations, the baseband circuitry may provide for communication compatible with one or more radio technologies. For example, in some implementations, the baseband circuitry may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various implementations, the baseband circuitry 720 may include circuitry to operate with signals that are not strictly considered as being in a baseband frequency. For example, in some implementations, baseband circuitry may include circuitry to operate with signals having an intermediate frequency, which is between a baseband frequency and a radio frequency.

RF circuitry 710 may enable communication with wireless networks using modulated electromagnetic radiation through a non-solid medium. In various implementations, the RF circuitry may include switches, filters, amplifiers, etc. to facilitate the communication with the wireless network.

In various implementations, the RF circuitry 710 may include circuitry to operate with signals that are not strictly considered as being in a radio frequency. For example, in some implementations, RF circuitry may include circuitry to operate with signals having an intermediate frequency, which is between a baseband frequency and a radio frequency.

In various implementations, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some implementations, the electronic device circuitry may be implemented in, or functions associated with the circuitry may be implemented by, one or more software or firmware modules.

In some implementations, some or all of the constituent components of the baseband circuitry, the application circuitry, and/or the memory/storage may be implemented together on a system on a chip (SOC).

Memory/storage 740 may be used to load and store data and/or instructions, for example, for system. Memory/storage for one implementation may include any combination of suitable volatile memory, such as dynamic random access memory (DRAM)), and/or non-volatile memory, such as flash memory.

In various implementations, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various implementations sensor 770 may include one or more sensing devices to determine environmental conditions and/or location information related to the system. In some implementations, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various implementations, the display 750 may include a display, such as a liquid crystal display and a touch screen display.

In various implementations, the system 700 may be a mobile computing device such as, but not limited to, a laptop computing device, a tablet computing device, a netbook, an ultrabook, a smartphone, etc. In various implementations, system may have more or less components, and/or different architectures.

Where appropriate, methods described herein may be implemented as a computer program. The computer program may be stored on a storage medium, such as a non-transitory storage medium.

In the implementation of the present disclosure, the method and the UE for performing the radio resource selection and contention indication in the wireless communication system includes selecting the sidelink resources from the sidelink resource pool and contending the at least one sidelink resource reserved in advance from the another UE, so as to provide at least one of a better protection to high priority messages in NR-V2X communication and a simple and effective method of sidelink resource selection and contention for NR-V2X communication through selecting and comparing message PPPP level, selecting and comparing message transmission periodicity, and/or selecting and comparing measured RSRP or RSSI level. The implementation of the present disclosure is a combination of techniques/processes that can be adopted in 3GPP specification to create an end product.

A person having ordinary skill in the art understands that each of the units, algorithm, and steps described and disclosed in the implementations of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure.

It is understood by a person having ordinary skill in the art that he/she can refer to the working processes of the system, device, and unit in the above-mentioned implementation since the working processes of the above-mentioned system, device, and unit are basically the same. For easy description and simplicity, these working processes will not be detailed.

It is understood that the disclosed system, device, and method in the implementations of the present disclosure can be realized with other ways. The above-mentioned implementations are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the implementations.

Moreover, each of the functional units in each of the implementations can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the implementations of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred implementations, it is understood that the present disclosure is not limited to the disclosed implementations but is intended to cover various arrangements made without departing from the scope of the broadest interpretation of the appended claims.

What we claimed is:

1. A user equipment (UE) in a wireless communication system, the UE comprising:
  a memory;
  a transceiver; and
  a processor coupled to the memory and the transceiver, wherein the processor is configured to:
  select a plurality of sidelink resources from a sidelink resource pool; and
  contend at least one of the sidelink resources reserved in advance by another UE, or determine that at least one of the sidelink resources reserved in advance by the UE from the sidelink resource pool is contended by another UE;

wherein the processor is configured to determine that the at least one of the sidelink resources reserved in advance by the UE from the sidelink resource pool is contended by the another UE, when a PPPP level of at least one data message transmitted by the another UE is higher than a PPPP level of at least one data message transmitted by the transceiver.

2. The UE of claim 1, wherein the processor is configured to contend the at least one of the sidelink resources reserved in advance by the another UE when at least one of following conditions is met:
there are no other immediately available sidelink resources selected and used without contention and/or collision from the sidelink resource pool;
an observed channel busy ratio (CBR) of the sidelink resource pool is greater than 80%; or
a contention rate of the sidelink resources reserved by the another UE is less than or equal to 50%.

3. The UE of claim 1, wherein one of the plurality of sidelink resources selected by the UE from the sidelink resource pool is contended by the another UE when at least one of following conditions is met:
an observed channel busy ratio (CBR) of the sidelink resource pool is greater than 80%; or
a contention rate of the sidelink resources reserved by the another UE is less than or equal to 50%.

4. The UE of claim 1, wherein if one of the selected plurality of sidelink resources by the UE from the sidelink resource pool is contended by the another UE or no longer part of available resources, the processor is configured to re-select a contended sidelink resource.

5. The UE of claim 1, wherein if one of the selected plurality of sidelink resources from the sidelink resource pool by the UE is contended by the another UE or no longer part of available resources, the processor is configured to skip or drop sidelink transmission in the contended sidelink resource if no other available resource is capable of being found.

6. The UE of claim 1, wherein the processor is configured to contend the at least one of the sidelink resources reserved in advance by the another UE, when a latency transmission of at least one data message transmitted by the another UE is greater than a latency transmission of at least one data message transmitted by the transceiver.

7. The UE of claim 1, wherein the processor is configured to contend the at least one of the sidelink resources reserved in advance by the another UE, when a transmit time interval of at least one data message transmitted by the transceiver is shorter than a transmit time interval of at least one data message transmitted by the another UE.

8. The UE of claim 1, wherein the processor is configured to contend the at least one of the sidelink resources reserved in advance by the another UE, when a transmission periodicity of at least one data message transmitted by the another UE is greater than a transmission periodicity of at least one data message transmitted by the transceiver.

9. The UE of claim 1, wherein the processor is configured to contend the at least one of the sidelink resources reserved in advance by the another UE, when a ProSe per packet priority (PPPP) level of at least one data message transmitted by the another UE is lower than a PPPP level of at least one data message transmitted by the transceiver.

10. A method for performing, a user equipment (UE), a radio resource selection and contention indication in a wireless communication system, the method comprising:
selecting a plurality of sidelink resources from a sidelink resource pool; and
contending at least one of the sidelink resources reserved in advance by another UE, or determining that at least one of the sidelink resources reserved in advance by the UE from the sidelink resource pool is contended by another UE;
determining that the at least one of the sidelink resources reserved in advance by the UE from the sidelink resource pool is contended by another UE, when a PPPP level of at least one data message transmitted by the another UE is higher than a PPPP level of at least one data message transmitted by the UE.

11. The method of claim 10, further comprising contending the at least one of the sidelink resources reserved in advance by the another UE when at least one of following conditions is met:
there are no other immediately available sidelink resources selected and used without contention and/or collision from the sidelink resource pool;
an observed channel busy ratio (CBR) of the sidelink resource pool is greater than 80%; or
a contention rate of the sidelink resources reserved by the another UE is less than or equal to 50%.

12. The method of claim 10, wherein the one of the plurality of sidelink resources selected by the UE from the sidelink resource pool is contended by the another UE when at least one of following conditions is met:
an observed channel busy ratio (CBR) of the sidelink resource pool is greater than 80%; or
a contention rate of the sidelink resources selected by the UE is less than or equal to 50%.

13. The method of claim 10, wherein if one of the selected plurality of sidelink resources by the UE from the sidelink resource pool is contended by the another UE or no longer part of available resources, re-selecting a contended sidelink resource.

14. The method of claim 10, wherein if one of the selected plurality of sidelink resources from the sidelink resource pool by the UE is contended by the another UE or no longer part of available resources, skipping or dropping sidelink transmission in the contended sidelink resource if no other available resource is capable of being found.

15. The method of claim 10, further comprising contending the at least one of the sidelink resources reserved in advance by the another UE, when a latency transmission of at least one data message transmitted by the another UE is greater than a latency transmission of at least one data message transmitted by the UE.

16. The method of claim 10, further comprising contending the at least one of the sidelink resources reserved in advance by the another UE, when a transmit time interval of at least one data message transmitted by the UE is shorter than a transmit time interval of at least one data message transmitted by the another UE.

17. The method of claim 10, further comprising contending the at least one of the sidelink resources reserved in advance by the another UE, when a transmission periodicity of at least one data message transmitted by the another UE is greater than a transmission periodicity of at least one data message transmitted by the UE.

18. The method of claim 10, further comprising: contending the at least one of the sidelink resources reserved in advance by the UE from the sidelink resource pool is contended by another UE, when a ProSe per packet priority (PPPP) level of at least one data message transmitted by the another UE is less than a PPPP level of at least one data message transmitted by the UE.

\* \* \* \* \*